US012263640B2

(12) United States Patent
Karri et al.

(10) Patent No.: US 12,263,640 B2
(45) Date of Patent: Apr. 1, 2025

(54) MULTI-DIRECTIONAL THREE-DIMENSIONAL PRINTING WITH A DYNAMIC SUPPORTING BASE

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Keerthi Samireddy, Visakhapatnam (IN); Akash U. Dhoot, Pune (IN); Balatripurasundari Nookala, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 17/398,404

(22) Filed: Aug. 10, 2021

(65) Prior Publication Data

US 2023/0051995 A1 Feb. 16, 2023

(51) Int. Cl.
*B29C 64/379* (2017.01)
*B25J 9/16* (2006.01)
(Continued)

(52) U.S. Cl.
CPC ........... *B29C 64/379* (2017.08); *B25J 9/1661* (2013.01); *B25J 9/1669* (2013.01); *B25J 9/1682* (2013.01);
(Continued)

(58) Field of Classification Search
CPC ... B29C 64/379; B29C 64/245; B29C 64/393; B33Y 10/00; B33Y 30/00; B33Y 40/00;
(Continued)

(56) References Cited

U.S. PATENT DOCUMENTS

| 4,987,851 A * | 1/1991 | Yasuda | ................. B05D 1/206 |
| | | | 118/503 |
| 2011/0166709 A1 * | 7/2011 | Kim | ...................... B25J 9/1612 |
| | | | 700/260 |

(Continued)

FOREIGN PATENT DOCUMENTS

| CN | 102939189 B | 8/2015 |
| CN | 106163771 B | 1/2019 |

(Continued)

OTHER PUBLICATIONS

Mel, et al. "The NIST Definition of Cloud Computing". Recommendations of the National Institute of Standards and Technology, Nov. 16, 2015.

(Continued)

*Primary Examiner* — Jerzi H Moreno Hernandez
(74) *Attorney, Agent, or Firm* — Kristofer Haggerty

(57) ABSTRACT

A computer-implemented dynamic supporting base creation method that interacts with a three-dimensional (3D) printer that prints an object, the method including providing a physical support, via a first robotic gripper, for an object during three-dimensional (3D) printing using a printing head of the 3D printer and transferring the object to a second robotic gripper to provide a physical support at a different location on the object.

12 Claims, 7 Drawing Sheets

(51) Int. Cl.
| | |
|---|---|
| *B25J 15/00* | (2006.01) |
| *B29C 64/245* | (2017.01) |
| *B29C 64/393* | (2017.01) |
| *B33Y 10/00* | (2015.01) |
| *B33Y 50/02* | (2015.01) |
| *B33Y 30/00* | (2015.01) |
| *B33Y 40/00* | (2020.01) |

(52) U.S. Cl.
CPC ......... *B25J 15/0009* (2013.01); *B29C 64/245* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ....... B33Y 50/02; B25J 9/1661; B25J 9/1669; B25J 9/1682; B25J 9/0084
See application file for complete search history.

(56) References Cited

U.S. PATENT DOCUMENTS

| | | | | |
|---|---|---|---|---|
| 2011/0175274 | A1* | 7/2011 | Hirano | B25J 9/0084 269/56 |
| 2013/0015596 | A1* | 1/2013 | Mozeika | B25J 9/0084 425/113 |
| 2013/0024573 | A1* | 1/2013 | Kushida | G06F 9/5077 709/226 |
| 2015/0239178 | A1* | 8/2015 | Armstrong | B29C 64/393 700/98 |
| 2016/0321095 | A1* | 11/2016 | Cropper | G06F 9/45533 |
| 2017/0129172 | A1* | 5/2017 | Waatti | B29C 64/379 |
| 2018/0117769 | A1* | 5/2018 | Delazari Binotto | B25J 9/1694 |
| 2020/0171650 | A1* | 6/2020 | Hallock | B25J 9/009 |
| 2020/0215609 | A1* | 7/2020 | Camilleri | B29C 64/379 |
| 2021/0076502 | A1 | 3/2021 | Gonsher et al. | |
| 2021/0268663 | A1* | 9/2021 | Gu | B25J 9/142 |
| 2021/0316509 | A1* | 10/2021 | Malhan | B29C 64/393 |
| 2022/0266521 | A1* | 8/2022 | Hasegawa | B29C 64/379 |

FOREIGN PATENT DOCUMENTS

| | | |
|---|---|---|
| CN | 110774581 A | 2/2020 |
| KR | 10-2018-0104667 A | 9/2018 |

OTHER PUBLICATIONS

Wu, et al., "Learning to Accelerate Decomposition for Multi-Directional 3D Printing", arXiv:2004.03450V3 [cs.GR] Jul. 18, 2020.

Authors, et al., "Method and system for 3D printing method to enable industrial Automation capability with the 3D printed object", an IP.com Prior Art Database Technical Disclosure; IP.com No. IPCOM000263516D; IP.com Electronic Publication Date: Sep. 7, 2020.

Authors, et al., "Method and system for dynamic assigning the printing activity to individual 3D printing during collaborative 3D printing", an IP.com Prior Art Database Technical Disclosure; IP.com No. IPCOM000263523D; IP.com Electronic Publication Date: Sep. 7, 2020.

Wu, et al., "Near support-free multi-directional 3D printing via global-optimal decomposition", Article in Graphical Model; Jun. 2019.

Gao, et al., "RevoMaker: Enabling Multi-directional and Functionally-embedded 3D Printing using a Rotational Cuboidal Platform", School of Mechanical Engineering, Purdue University West Lafayette, IN 47907; Nov. 8-11, 2015.

Anonymous, "3D Printing Services for a Wide Range of Applications," Stratasys, downloaded from the internet on Jan. 19, 2024, 10 pages, <https://www.stratasys.com/en/stratasysdirect/manufacturing-services/3d-printing/>.

Kaur et al., "Toward a Smart Compliant Robotic Gripper Equipped with 3D-Designed Cellular Fingers," Advanced Intelligent Systems, vol. 1, Issue 3, Jul. 2019, DOI: 10.1002/aisy.201900019, 12 pages, <https://onlinelibrary.wiley.com/doi/full/10.1002/aisy.201900019>.

Mell et al., "The NIST Definition of Cloud Computing", Recommendations of the National Institute of Standards and Technology, Nov. 16, 2015, 7 pages.

Wu et al., "General Support-Effective Decomposition for Multi-Directional 3D Printing," arXiv:1812.00606v4 [cs.RO] Aug. 27, 2019, 12 pages.

* cited by examiner

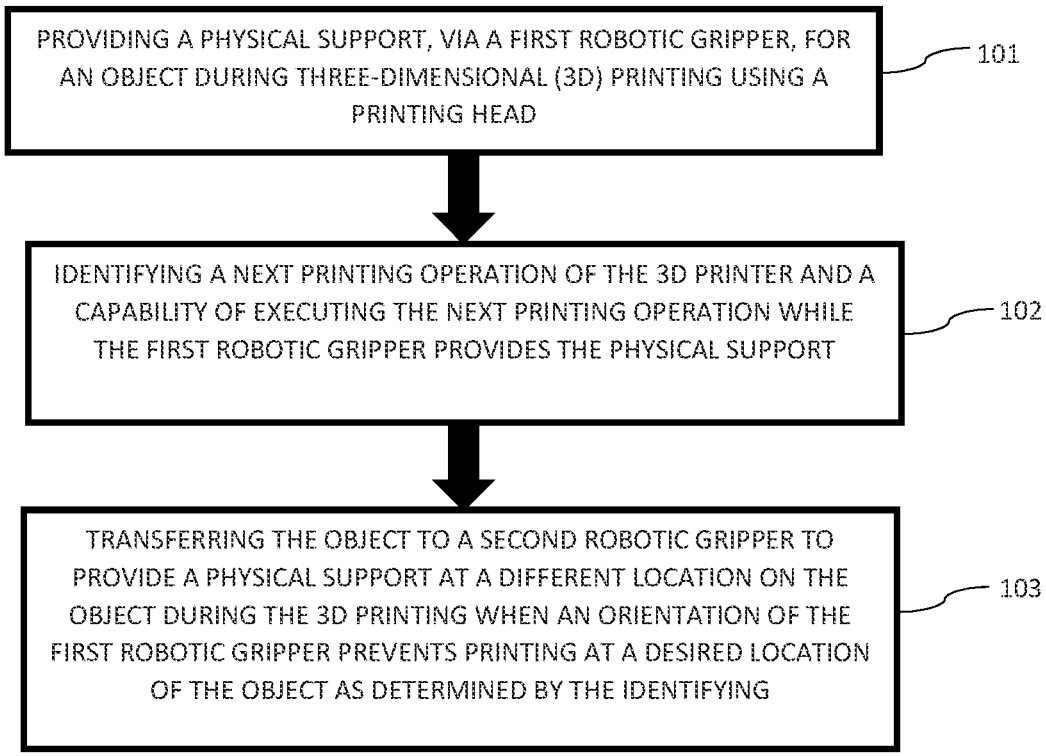

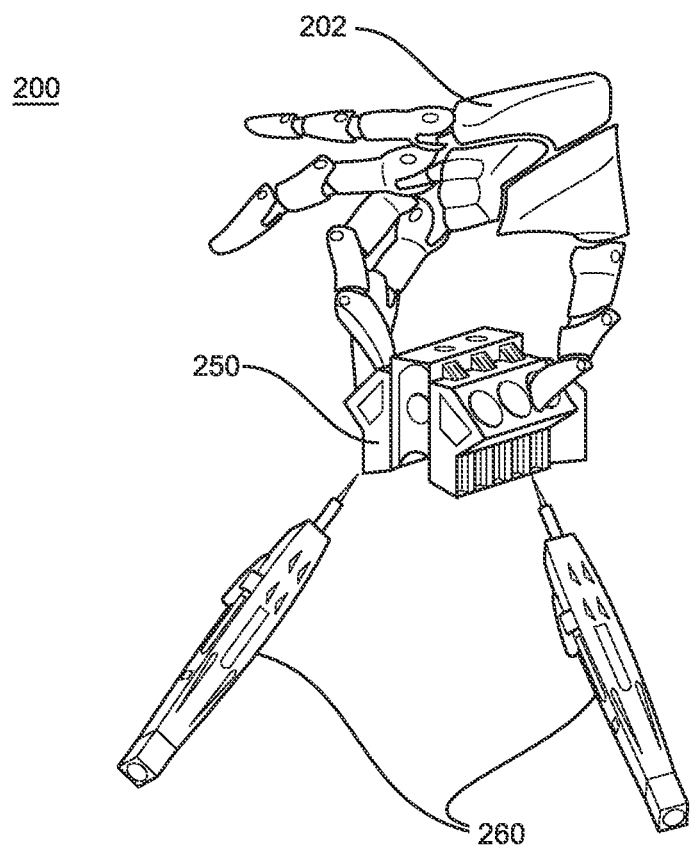
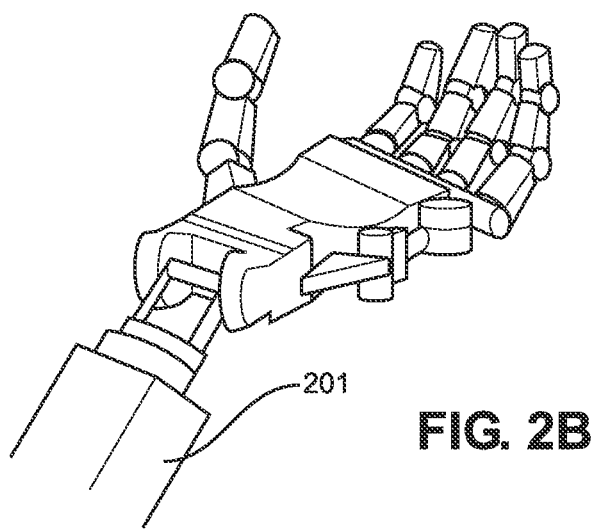
FIG. 2B

MULTI-DIRECTIONAL THREE-DIMENSIONAL PRINTING WITH A DYNAMIC SUPPORTING BASE

BACKGROUND

The present invention relates generally to a dynamic supporting base creation method and system thereof, and more particularly, but not by way of limitation, to a system and method by which a multi-head, three-dimensional (3D) printer creates a dynamic supporting base for 3D printing, and the supporting base is not always static. Based on the progress of the printing, the system and method identifies an appropriate supporting base position with respect to the object that is being printed and provides appropriate physical support from different directions.

A 3D printing process builds a three-dimensional object from a computer-aided design (CAD) model, usually by successively adding material layer-by-layer. Such a technique is also called "additive manufacturing." The term "3D printing" covers a variety of processes in which a material is joined or solidified under computer control to create a 3D object, with material being added together (e.g., such as liquid molecules or powder grains being fused together), typically layer by layer. A 3D printer can be used for printing a new object or can be used for repairing an object.

Conventionally, 3D printing requires a physical base on which the 3D printed object is printed layer-by-layer. While layer-by-layer printing is performed, layers are creating a bond with each other, and gradually the final object is created.

However, conventional physical bases are static objects on which the printing is performed. Thus, it is difficult to print (or paint) from all directions (or angles), as an area covered by the base cannot be printed (or painted) with 3D printing.

Therefore, there is a problem in the art that the conventional techniques do not facilitate a dynamic base to allow printing from all angles.

SUMMARY

Thus, the inventors have considered a technical solution to the technical problem in the conventional techniques by designing a hanging point as a base and exchange an object between supports, thereby to rotate the base such that multi-directional printing can be performed around the hanging point. Indeed, while performing 3D printing, robotic grippers (e.g., robotic hands as shown in FIGS. 2A-2B) can exchange a printed object between the robotic grippers to allow for printing from all angles.

In an exemplary embodiment, the present invention can provide a computer-implemented dynamic supporting base creation method that interacts with a three-dimensional (3D) printer that prints an object, the method including providing a physical support, via a first robotic gripper, for an object during three-dimensional (3D) printing using a printing head of the 3D printer and transferring the object to a second robotic gripper to provide a physical support at a different location on the object.

In another exemplary embodiment, the present invention can provide a printing system including a printer head, an object, a first robotic gripper, and a second robotic gripper, where the object is transferred between the first robotic gripper and the second robotic gripper based on access for the printing head to print the object.

In another exemplary embodiment, the present invention can provide a printing control apparatus for a three-dimensional (3D) printer, the printing control apparatus including a controller that includes a processor and a memory that stores instructions to cause the processor to operate: a first robotic gripper that provides a physical support for an object at a first location on the object and a second robotic gripper, where the controller commands the second robotic gripper to remove the object from the first robotic gripper and provide the physical support for the object at a second location on the object.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes (and others) of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for a dynamic supporting base creation method 100;

FIGS. 2A-2B exemplarily depict an example of a dynamic supporting base creation system 200;

DETAILED DESCRIPTION

Figure 2A:
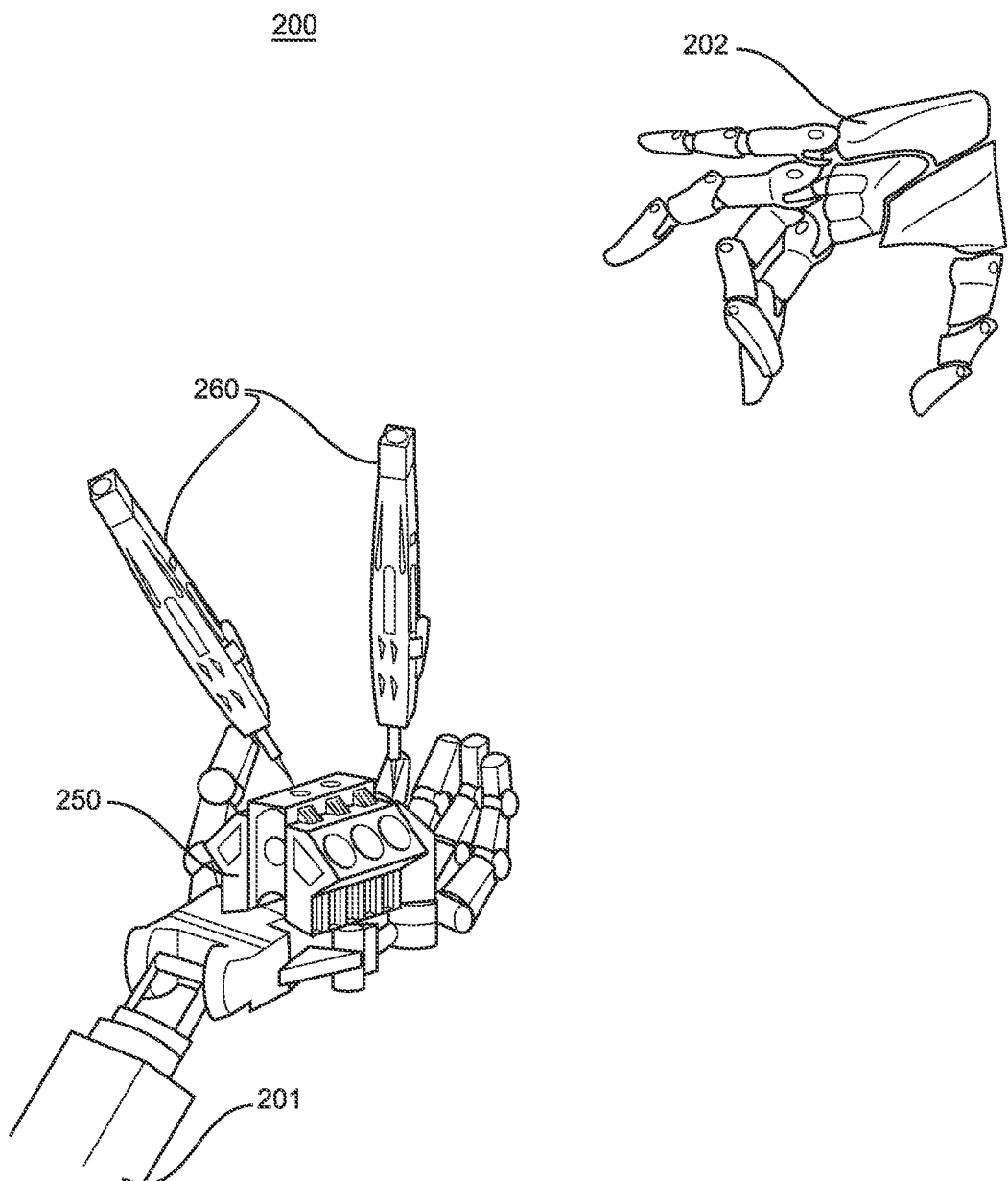

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a dynamic supporting base creation method 100 according to the present invention can include various steps for a novel technique for enabling 3D printing from all angles, directions and orientations, using robotic gripper(s) that form a dynamic base by exchanging the object therebetween.

Figure 4:
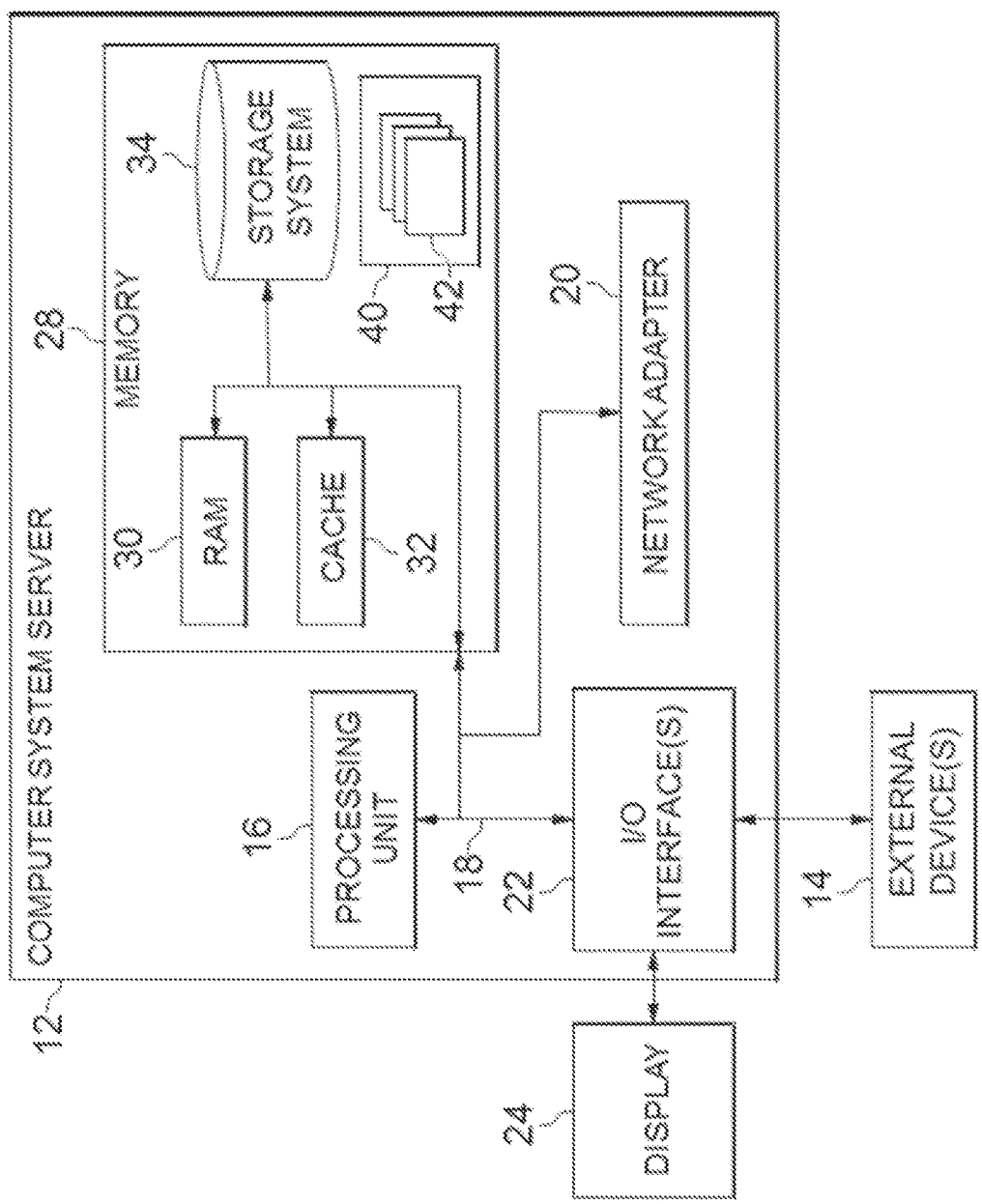
FIG. 4 depicts a cloud-computing node 10 according to an embodiment of the present invention.

By way of further introduction of the example depicted in FIG. 4, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 6), it is nonetheless understood that the present invention can be implemented outside of the cloud environment.

With reference now to the exemplary method 100 depicted in FIG. 1 and the printing system 200 depicted in FIGS. 2A-2B, the invention can facilitate 3D printing by providing physical support at varying locations, angles, orientations, and directions of the object such that the physical support does not interfere with the printing.

In other words, if a robotic gripper of the invention is providing physical support as a base and printing is required underneath the base, the object can be transferred via the method 100 and system 200 to a second robotic gripper to provide a hanging support such that printing is easy to execute via printing heads underneath (or adjacent) the object where the prior base support was given.

With reference first to FIGS. 2A-2B, FIGS. 2A-2B exemplarily depicts an embodiment of the printing system 200 that includes a first robotic gripper (e.g., "hand") 201 and a second robotic gripper (e.g., "hand") 202. The first robotic hand includes a supporting base type of physical support in that the object is held in the palm of the robotic gripper. When it is determined that the second robotic gripper 202 is required to grip the object (as described later), the second robotic hand 202 grips the object via the pointer finger and thumb of the second robotic gripper 202. Then, the printing heads can print the object from a different direction.

Although not depicted, if another movement is required, the object can be transferred back to the first robotic gripper 201 and the first robotic gripper 201 can also grip the object via a thumb and pointer finger. In other words, the first robotic gripper 201 can provide a base physical support at first and then later provide a hanging type support.

With reference specifically to the method 100 of FIG. 1, in step 101, a physical support is provided, via first robotic gripper 201, for an object during three-dimensional (3D) printing using a printing head.

In step 102, a next printing operation of the 3D printer is identified and a capability of executing the next printing operation while the first robotic gripper 201 provides the physical support is identified.

In step 103, the object is transferred to a second robotic gripper 202 to provide a physical support at a different location, orientation, direction, angle, etc. on the object during the 3D printing when an orientation of the first robotic gripper 201 prevents printing at a desired location of the object as determined by the identifying.

For example, as shown in FIGS. 2A-2B, physical support is provided at a first location via a base by the first robotic gripper 201. Then, when the object is transferred from the first robotic gripper 201 to the second robotic gripper, the object is supported at a second location (i.e., held at the top of the object as a hanging support so the object can be rotated). Thereby, 3D printing can be facilitated via the printing heads at a location that was not accessible when the first robotic gripper 201 was supporting the object.

The method 100 further includes embodiments that assist in the printing of an object. For example, the method 100 interacts with two or more robotic grippers (201, 202, . . . , 20X) and these robotic grippers provide physical support on the object is being printed. While the object is being printed, then any gripper can provide the physical support and then the object portion that has been already printed can be transferred to another gripper for gripping the object from a different direction/angle/orientation/location and different portion of the object.

As shown in FIGS. 2A-2B, a first robotic gripper can be used to support a base of the object. The second robotic gripper is not being used. Upon determination that a portion of the object cannot be accessed by the printing heads (as described later), the second robotic gripper supports the object from a different location (e.g., in this case, provides a hanging support) such that printing can occur in the area that the prior support by the first robotic gripper was obscuring. In other words, while the object is being printed, another robotic gripper can grip the object from a different direction/angle etc. and/or grip the object from a different position of the object.

The robotic gripper can provide a physical supporting base for printing or a hanging support, can perform gripping of the object, and can be dynamically moved via the robotic supporting gripper. For example, when hanging support is provided, the object can be dynamically rotated (i.e., spun about an axis or rotated about multiple axes) to allow access to the object for the printing head(s). That is, each gripper can have a multi-directional movement capability so that the object can be printed from different directions/angels/orientations.

In one embodiment, the robotic gripper includes a robotic hand with four fingers and a thumb to mimic a human hand manipulating the object. However, the invention is not limited to a human hand-like robotic hand and can include a grapple-type assembly with a pointer finger and thumb action only. In another embodiment, one of the robotic grippers can be a flat base structure and a second of the robotic grippers can be a human hand-like structure. Thus, multiple designs for the robotic grippers can be included in the two or more robotic grippers, and the two (or plurality of) grippers may have the same or different configurations.

With reference back to step 102, step 102 analyzes the object and identifies a size, shape and/or dimension of the object via a camera watching the printing, a manual input, a computer-aided design (CAD) model that is pre-run to determine the shape and dimension during printing, a cloud-computing solution that is run on a cloud server, etc.

During the analysis, a center of gravity of the object is determined at each position of the object as held by the robotic gripper. In doing so, the object is analyzed to determine if the object can continue to be printed without a change in position. If a change in position is required, then step 102 further determines exactly how the object needs to be re-positioned or how to change the robotic gripper's positioning/location/grip etc., such that printing can be accessible. When any object is to be printed, step 102 identifies how and when the position of the gripper can be changed, so that printing can be done from a different direction/angle/orientation. Step 102 selects one gripper and another printing head will be printing from a different direction.

And, to facilitate efficiency in printing, optimally the second robotic gripper grips the object in a portion that is not being printed such that there is no downtime waiting for the object to dry from printing and/or allow the printing heads to continue to print while the second robotic gripper grips the object. The 3D object is classified based on which gripper should be gripping the object, so that printing can be performed from a different direction. In other words, the object could be damaged if the second robotic gripper grips the object in the area that was just printed. Such is avoided by the invention.

Therefore, the analysis in step 102 includes determining a portion of the object to be gripped such that there is no downtime by identifying a current condition of the printing such as solidification time, weight, etc., and accordingly by identifying an appropriate gripping position.

When the invention includes more than two other robotic grippers than the current robotic gripper that is gripping the object and when the position of the gripping is to be changed, the appropriate gripper to be used is identified that performs the optimal gripping. For example, either a third robotic gripper or the first robotic gripper can be identified to provide a third physical support at a third location on the object based on a capability of the third robotic gripper and a capability of the first robotic gripper.

Thus, the method 100 can provide a robotic gripper(s) or an intelligent printer base which automatically identifies the gripper(s) with full coverage of the object (i.e., able to grip so that printing can be done on 100% of the object), performs a hand-over from one gripper to another, determines and makes predictive sequencing of hand-off and printing, optimizes print time and performs intelligent flushing/refill of print heads.

Figure 3:
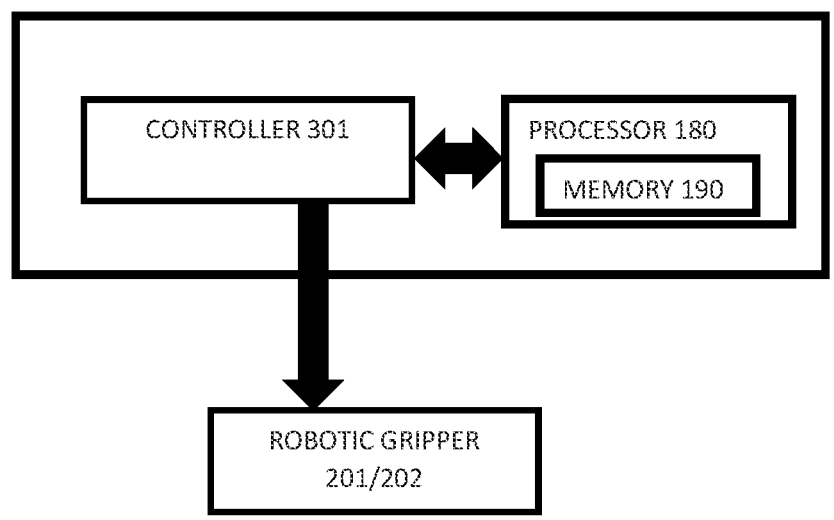
FIG. 3 exemplarily depicts a structure of a robotic gripper control apparatus 300 for use with a 3D printer.

With reference to FIG. 3 and the robotic gripper control apparatus 300, the robotic gripper control apparatus 300 includes a processor 180 and memory 190 that includes instructions to cause the processor 180 to operate the controller 301 which is connected to the robotic grippers (201, 202, . . . , 20X). For example, the memory 190 can store instructions that can execute the method 100 via the controller 301. Thereby, the controller 301 can be connected to each of the robotic grippers and the controller can control the movement thereof.

Also, the apparatus 300 can be connected to a network such as a cloud computing environment or the internet so that off-site printing can be performed. For example, it is beneficial to have the computing programs for determining the printing be off-site from the actual printer itself. The network connection of the apparatus 300 can allow for a connection between the off-site printer and the operator.

Thus, with reference generally to the method 100, the system 200, and the apparatus 300, the invention can provide 3D printing with two or more robotic gripper bases and two or more printing heads. An appropriate robotic gripper base properly grips the object as it is being printed and accordingly one or more printing heads will be printing the object from a different direction.

Based on the need of a printing direction of the object that is being printed, the invention interchanges the gripping direction or hands the object over to another gripper so that printing can be done from different directions of the object is being printed. While the object is being printed, the invention identifies a sequence of handing over to the other robotic gripper and will identify an optimum printing time of the object being printed.

For example, the optimum printing time can be determined based on the size, shape and/or dimension of the object that is to be printed. The inventive system can identify how the object is to be gripped so that printing can be continued efficiently, and based on the need, a gripping position can be interchanged. The appropriate robotic gripper and direction of gripping will be selected dynamically based on a time required for solidification of the object already printed, if the gripping position can enable multi-directional printing, and a size, shape and/or a dimension of the object that is already printed and the final shape where physical support is required.

Thereby, the invention helps a user to have a dynamic view of a production timeline based on a precise handling performed by the robotic grippers in handling and exchanging the positions of objects in an ideal way for better lead times, thereby providing a faster and effective supply chain.

Additionally, the invention auto-creates a dependency map and prepares a user beforehand for timely maintenance and an ordering of required material according to a type of object and a directional dependency (e.g., high usage of one direction versus the other). For example, the invention can identify the flushing requirements of a 3D printer base in advance based on the object being printed, a layer being printed, a type of material, a direction of printing head in printing action and accordingly coordinate with the robotic grippers for optimal flush and fill of required color for the context.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 4, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
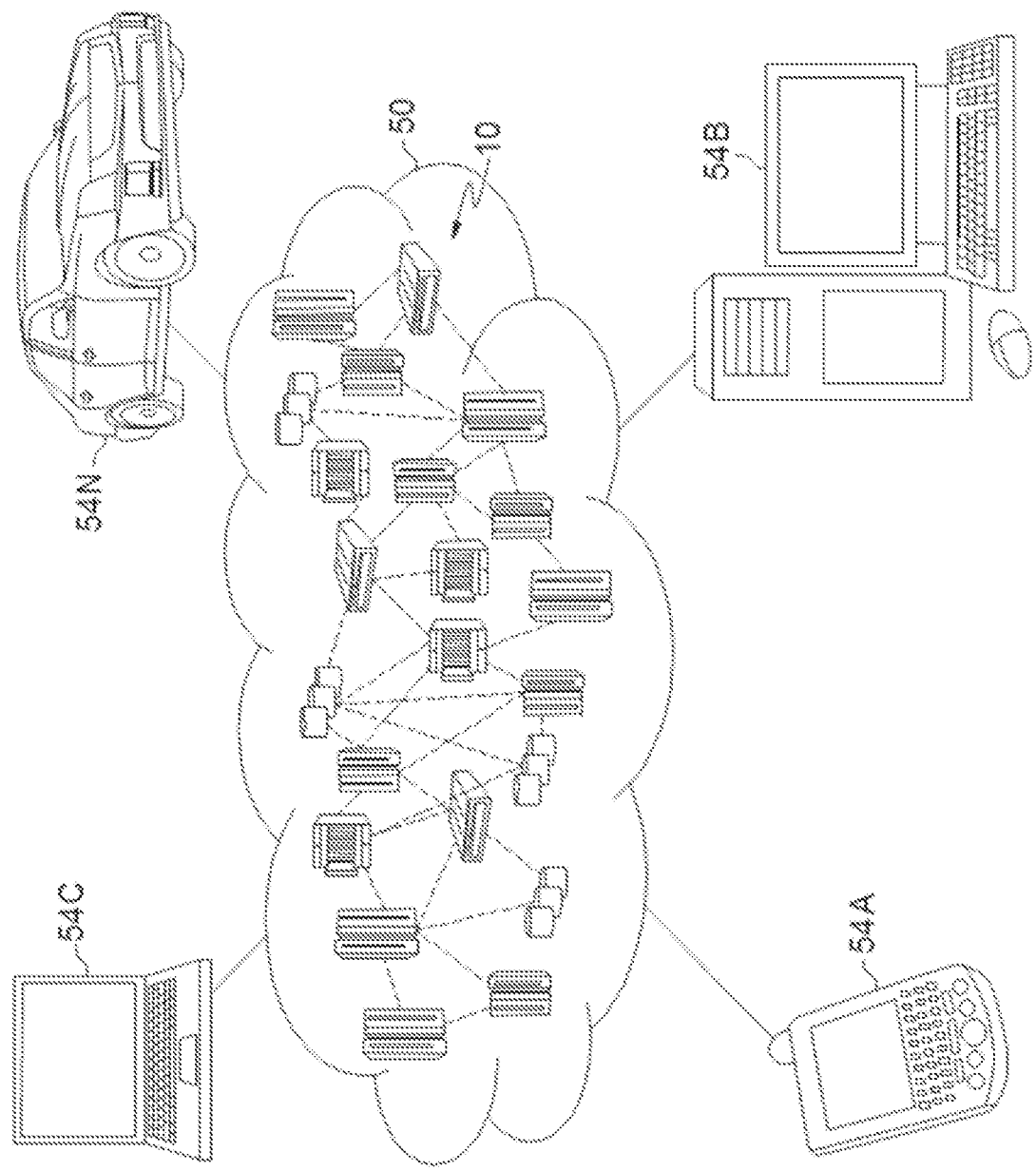
FIG. 5 depicts a cloud-computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
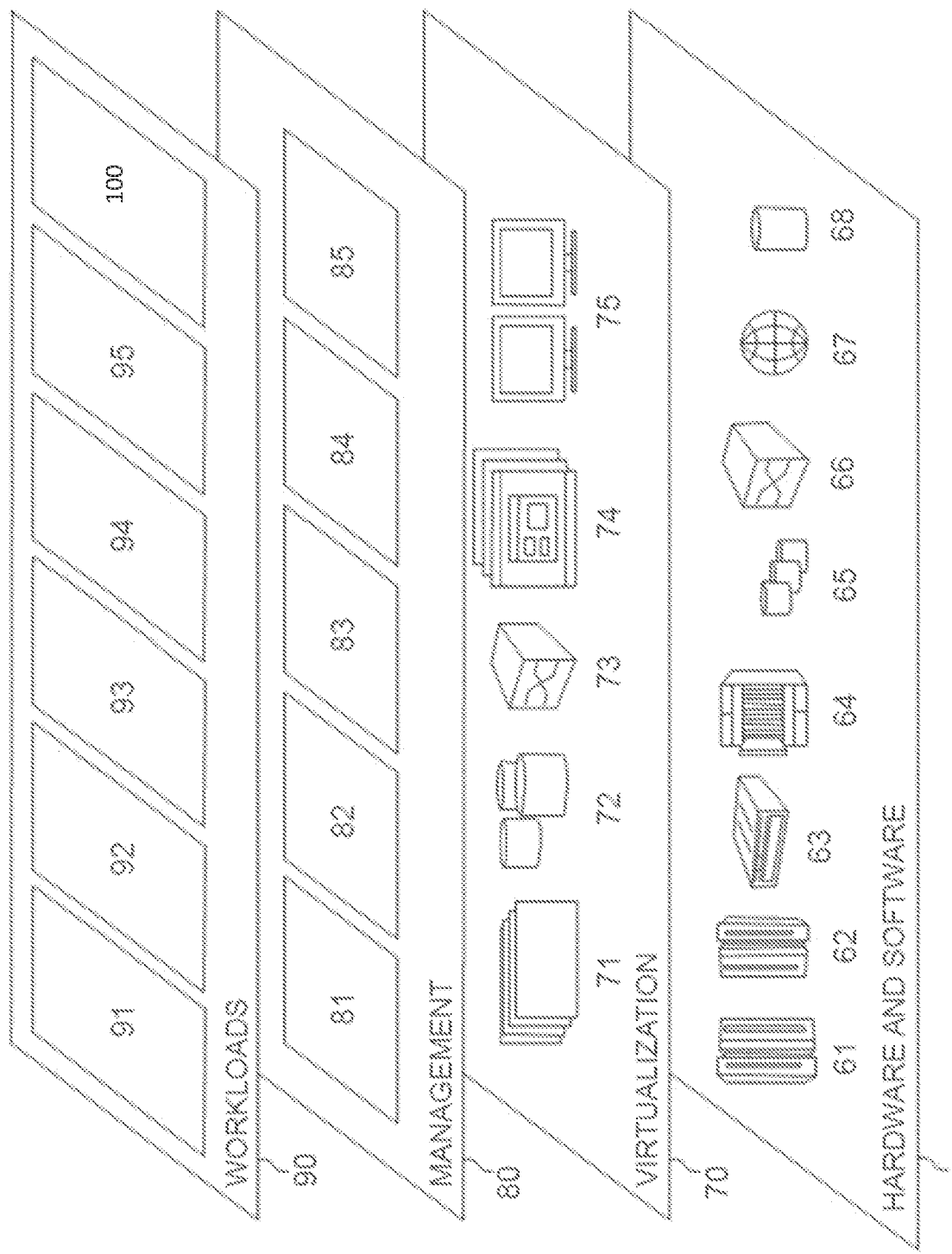
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented dynamic supporting base creation method that interacts with a three-dimensional (3D) printer that prints an object, the method comprising:
   providing a physical support, via a first robotic gripper, for the object during three-dimensional (3D) printing using a printing head of the 3D printer;
   determining a different location to provide a second physical support of the object via a second robotic gripper based on one or more next printing operations; and
   transferring, during the three-dimensional (3D) printing, the object to the second robotic gripper to provide the second physical support at the different location on the object.

2. The computer-implemented dynamic supporting base creation method of claim 1, further comprising identifying a capability of executing the one or more next printing operations while the first robotic gripper provides the physical support.

3. The computer-implemented dynamic supporting base creation method of claim 1, wherein the first robotic gripper and the second robotic gripper each comprise a hand-type robotic gripper.

4. The computer-implemented dynamic supporting base creation method of claim 1, wherein the first robotic gripper and the second robotic gripper dynamically rotate when supporting the object to provide access for the printing head of the 3D printer.

5. The computer-implemented dynamic supporting base creation method of claim 1, wherein the physical support comprises a type of support that is different than that of the second physical support.

6. The computer-implemented dynamic supporting base creation method of claim 5, wherein the type of support comprises one of:
a base support; and a hanging support.

7. The computer-implemented dynamic supporting base creation method of claim 1, wherein the different location on the object is located such that the second robotic gripper grips the object from a different direction than a direction of printing of the printing head of the 3D printer.

8. The computer-implemented dynamic supporting base creation method of claim 2, wherein the identifying identifies the different location on the object such that the second robotic gripper grips the object from a different direction than a direction of printing of the printing head of the 3D printer while the printing head of the 3D printer completes printing of the object from another direction.

9. The computer-implemented dynamic supporting base creation method of claim 1, embodied in a cloud-computing environment.

10. The computer-implemented dynamic supporting base creation method of claim 1, wherein the transferring occurs prior to the object being completely printed by the 3D printer.

11. A computer-implemented dynamic supporting base creation method that interacts with a three-dimensional (3D) printer that prints an object, the method comprising:

providing a physical support, via a first robotic gripper, for the object during three-dimensional (3D) printing using a printing head of the 3D printer;

determining a different location to provide a second physical support of the object via a second robotic gripper based on one or more next printing operations; and transferring, during the three-dimensional (3D) printing, the object to the second robotic gripper to provide the second physical support at the different location on the object.

12. The computer-implemented dynamic supporting base creation method of claim 11, wherein the physical support includes supporting the object on an entirety of a bottom surface of the object.

* * * * *